United States Patent
Holtsclaw et al.

(10) Patent No.: US 9,890,323 B2
(45) Date of Patent: Feb. 13, 2018

(54) MULTIFUNCTIONAL BORONIC CROSSLINKERS AS DUAL VISCOSIFICATION AND FRICTION REDUCING AGENTS

(71) Applicant: Halliburton Energy Services, Inc., Houston, TX (US)

(72) Inventors: Jeremy Holtsclaw, Kingwood, TX (US); Ubong Inyang, Humble, TX (US); Dipti Singh, Kingwood, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 14/786,998

(22) PCT Filed: Sep. 26, 2013

(86) PCT No.: PCT/US2013/061802
§ 371 (c)(1),
(2) Date: Oct. 26, 2015

(87) PCT Pub. No.: WO2015/047261
PCT Pub. Date: Apr. 2, 2015

(65) Prior Publication Data
US 2016/0090526 A1   Mar. 31, 2016

(51) Int. Cl.
| | | |
|---|---|---|
| E21B 43/22 | (2006.01) | |
| E21B 43/26 | (2006.01) | |
| C09K 8/88 | (2006.01) | |
| C09K 8/035 | (2006.01) | |
| C09K 8/68 | (2006.01) | |

(52) U.S. Cl.
CPC ............. C09K 8/882 (2013.01); C09K 8/035 (2013.01); C09K 8/685 (2013.01); C09K 8/887 (2013.01); E21B 43/26 (2013.01); C09K 2208/28 (2013.01)

(58) Field of Classification Search
CPC ........ C09K 8/685; C09K 8/887; C09K 8/512; C09K 8/12; E21B 43/26; E21B 43/267
See application file for complete search history.

(56) References Cited

U.S. PATENT DOCUMENTS

| | | |
|---|---|---|
| 7,687,441 B2 | 3/2010 | Hanes, Jr. et al. |
| 8,173,580 B2 | 5/2012 | De Benedictis et al. |
| 8,424,603 B2 | 4/2013 | Loveless et al. |
| 2006/0089265 A1 | 4/2006 | Hanes et al. |
| 2012/0000659 A1 | 1/2012 | Loveless et al. |
| 2012/0004148 A1 | 1/2012 | Ogle et al. |
| 2012/0220503 A1 | 8/2012 | Sanchez Reyes et al. |

FOREIGN PATENT DOCUMENTS

| | | |
|---|---|---|
| WO | 2012122505 A2 | 9/2012 |
| WO | WO2015047261 A1 | 4/2015 |

OTHER PUBLICATIONS

International Search Report and Written Opinion for PCT/US2013/061802 dated Jun. 24, 2014.

Primary Examiner — Zakiya W Bates
(74) Attorney, Agent, or Firm — McDermott Will & Emery LLP (57) ABSTRACT

A method includes steps of: providing a treatment fluid including an aqueous base fluid, a gelling agent, and a multifunctional boronic crosslinker, and introducing the treatment fluid into a subterranean formation. The multifunctional boronic crosslinker includes a dendritic polymer including a water-soluble monomer and a boronic acid group, and the ratio of the water-soluble monomer to the boronic acid group is in the range from about 1:210 to about 1:800.

20 Claims, 4 Drawing Sheets

MULTIFUNCTIONAL BORONIC CROSSLINKERS AS DUAL VISCOSIFICATION AND FRICTION REDUCING AGENTS

BACKGROUND

In exemplary embodiments, the methods and compositions herein provide multifunctional boronic crosslinkers having low boronic acid content that may act as viscosification agents and/or friction reducing agents in fluids.

Many industrial applications require viscosified fluids that do not suffer from substantial friction reduction when pumped through tubulars, such as into a subterranean formation. Such industrial applications may include subterranean operations requiring treatment fluids having such properties for use in operations including, but not limited to, drilling operations, lost circulation operations, stimulation operations, acidizing operations, acid-fracturing operations, sand control operations, completion operations, scale inhibiting operations, water-blocking operations, clay stabilizer operations, fracturing operations, frac-packing operations, gravel packing operations, wellbore strengthening operations, sag control operations, and the like.

Traditionally, the treatment fluids are viscosified by use of a gelling agent. Common gelling agents include biopolymers or synthetic polymers, such as galactomannan gums, cellulosic polymers, and polysaccharides. Many viscosified treatment fluids further comprise a crosslinking agent capable of increasing the gelling agents' ability to impart viscosity to the fluid. These crosslinking agents typically comprise a metal ion, transition metal, or metalloid (collectively referred to herein as "metal(s)"). Examples include boron, aluminum, antimony, zirconium, magnesium, or titanium. Generally, the metal of a crosslinking agent interacts with at least two gelling agent molecules to form a crosslink between them, thereby forming a crosslinked gelling agent. These metal crosslinking agents have traditionally been placed into treatment fluids at high concentrations with a high concentration of gelling agents to ensure that the desired viscosity of the treatment fluid is reached and maintained over time. Such high concentrations may lead to increased costs and may also make the treatment fluid difficult to handle in certain circumstances (e.g., removal from a subterranean formation).

Subterranean operations often require large amounts of treatment fluids to be pumped downhole under high pressures and high flow rates in short periods of time, causing turbulent flow of the treatment fluids, even in viscous treatment fluids. The turbulence results in friction pressure between the treatment fluid and the subterranean operations equipment (e.g., wellbore piping, wellbore casing, etc.) and between the treatment fluid and the subterranean formation itself. The friction pressure increases the energy necessary to pump the treatment fluid downhole and can cause damage to subterranean operation equipment and the formation. To combat the friction pressure, friction reducing agents are often added to treatment fluids already comprising gelling agents and crosslinkers. Traditional friction reducing agents are high molecular weight, long-chain polymers (e.g., polyacrylamide) that are able to change the rheological properties of the treatment fluid to overcome or minimize friction pressure. High molecular weight, long-chain friction reducing polymers are capable of converting turbulent flow to laminar flow, thereby reducing frictional drag and pressure loss. Traditional friction reducing polymers tend to be characterized by a large hydrodynamic radius such that upon shearing, the friction reducing polymers can absorb energy from high nucleation sites by stretching to a more relaxed form and redistribute the energy to other locales.

BRIEF DESCRIPTION OF THE DRAWINGS

The following figures are included to illustrate certain aspects of the embodiments disclosed herein, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

In exemplary embodiments, the methods and compositions herein provide multifunctional boronic crosslinkers having low boronic acid content that may act as viscosification agents and/or friction reducing agents in fluids.

Although some embodiments herein are discussed in context of subterranean operations applications, such discussion is intended to illustrate some applications for use of the multifunctional boronic crosslinkers. The multifunctional boronic crosslinkers may be used in any non-subterranean operation that may benefit from their viscosification and/or friction reducing properties. Such operations may be performed in any industry including, but not limited to, oil and gas, mining, chemical, pulp and paper, converting, aerospace, medical, automotive, and the like.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, business-related, government-related, and other constraints, which vary by implementation and from time to time. While a developer's efforts might be complex and time-consuming, such efforts would be, nevertheless, a routine undertaking for those of ordinary skill in the art having the benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

Embodiments disclosed herein relate to treatment fluids comprising a multifunctional boronic crosslinker. There may be several potential advantages to the methods and compositions of the embodiment disclosed herein, only some of which may be alluded to herein. Regarding the use of the multifunctional boronic crosslinker as a viscosification agent, the treatment fluids comprising the multifunctional boronic crosslinker may exhibit improved gelling characteristics despite a lower concentration of the multifunctional boronic crosslinker than would be required if traditional crosslinkers were used. Additionally, the treatment fluids comprising the multifunctional boronic crosslinker may be broken by simply lowering the pH of the treatment fluid and then re-viscosified by again increasing the pH to a level of at least slightly basic (e.g., above about 7.5). As used herein, the term "broken" and all of its variants (e.g., "break," "broke," and the like) refers to a reduction in the viscosity of a fluid. By way of example, depending on the amount of gelling agent, the amount of the multifunctional boronic crosslinker, and the presence of any additional crosslinkers, the fluid may crosslink (i.e., increase in viscosity) at a pH above about 7.5, or ranging from a pH of about 7.5 to about 11. In some specific cases the fluid may be crosslinked at a pH of at least about 7.5, 8, 8.5, 9, 9.5, 10, 10.5, or 11. As another advantage, the multifunctional boronic crosslinker can be used to viscosify a treatment fluid below the traditional overlap concentration of gelling agents present in the treatment fluid. In addition, the treatment fluids comprising the multifunctional boronic crosslinker may exhibit viscoelastic behavior.

As well as their use as viscosification agents, the multifunctional boronic crosslinkers of the embodiments disclosed herein may operate alone or in combination as a friction reducing agent. Indeed, the multifunctional boronic crosslinkers may act as a friction reducing agent, whereas traditional friction reducing agents (e.g., a polyacrylamide friction reducing agent) are not able to provide such a benefit to treatment fluids. Even at lower flow rates, the multifunctional boronic crosslinkers reduce the friction pressure generated by resistance to treatment fluid flow. As used herein, the term "friction reducing agent" refers to an agent that reduces frictional losses due to friction between a fluid and a tubular conduit, pumping equipment or other subterranean operation equipment, and/or the formation itself (which may collectively be referred to as "contacted surfaces"). In some embodiments, the multifunctional boronic crosslinker may act as a friction reducing agent and reduce frictional losses due to friction between the treatment fluid and one or more surfaces contacted by the treatment fluid by an amount in the range of from a lower limit of about 10%, 15%, 20%, 25%, 30%, 35%, and 40% to an upper limit of about 70%, 65%, 60%, 55%, 50%, 45%, and 40% compared to the treatment fluid without the multifunctional boronic crosslinker.

The multifunctional boronic crosslinkers may be thermally stable at temperatures above about 93.3° C. (200° F.) and in certain embodiments, the multifunctional boronic crosslinkers may be particularly suitable at temperatures ranging from about 23.9° C. (75° F.) to about 135° C. (275° F.).

In general, the treatment fluids of the embodiments disclosed herein comprise an aqueous base fluid, a gelling agent, and a multifunctional boronic crosslinker. The aqueous base fluid may include, but is not limited to, fresh water; salt water (e.g., water containing one or more salts dissolved therein); brine (e.g., saturated salt water); seawater; weighted brine (e.g., calcium bromide, sodium bromide, and the like); and any combination thereof. The aqueous base fluids may be from any source. In general, the aqueous fluid should not contain an excess of compounds that can adversely affect the desired properties of the treatment fluids (e.g., viscosification and/or fluid reduction by inclusion of the multifunctional boronic crosslinkers).

In various embodiments, the treatment fluids disclosed herein may be used in a number of subterranean operations, which have been set forth hereinabove. In some embodiments, the treatment fluids can be introduced into at least a portion of a subterranean formation. In some embodiments, the treatment fluids can be introduced into at least a portion of a subterranean formation and used to create or enhance at least one fracture therein.

The multifunctional boronic crosslinkers disclosed herein may be capable of crosslinking two or more molecules (e.g., two or more gelling agent molecules). As used herein, the term "crosslink(s)" and all of its variants (e.g., "crosslinking") refers to a connecting unit between neighboring chains of atoms in a complex chemical molecule (e.g., a polymer or biopolymer). In some embodiments, the multifunctional boronic crosslinker may comprise a polymeric backbone with at least one boronic acid group attached at one or more points along the polymer chain. In some embodiments, the multifunctional boronic crosslinker may comprise a copolymer that comprises at least one boronic acid monomer and at least one water-soluble monomer. In other embodiments, the multifunctional boronic crosslinker may comprise a random copolymer of at least one boronic acid monomer and at least one water-soluble monomer. In some embodiments, the multifunctional boronic crosslinker may comprise a copolymer that is a gradient copolymer. When the multifunctional boronic crosslinker is a copolymer, the presence of a solubilizing agent during polymerization may allow the boronic acid monomers to more easily polymerize, which may protect at least a portion of the boronic acid functionalities. Moreover, the presence of a solubilizing agent either before or during polymerization (which may occur within the treatment fluid) may solubilize the boronic acid monomer at lower pH values (e.g., pH 9), which may lead to more effective polymerization.

In some embodiments, the multifunctional boronic crosslinker may be di-, tri-, or multifunctional in nature. Except as otherwise made explicit, as used herein, the term "multifunctional" encompasses such di-, tri-, and multifunctional molecules. In some embodiments, the multifunctional boronic crosslinker may be star shaped or dendritic shaped. The multifunctional boronic crosslinker may also be polymeric in nature. In some embodiments, a polymeric multifunctional boronic crosslinker may be a block copolymer (e.g., a diblock, triblock, or multiblock copolymer) or a copolymer of various monomers and in the form of a comb or brush shaped polymer. In still other embodiments, the multifunctional boronic crosslinker may be water-soluble.

In some embodiments, the multifunctional boronic acid crosslinker may be star shaped or dendritic shaped. An example of an exemplary structure of a dendritic shaped multifunctional boronic crosslinker is shown in Formula I.

Formula I

As used herein, the terms "dendritic polymers" or "dendrimers" refer to polymers that are characterized by a branched structure. Dendrimers (e.g., cascade polymers, arborols, isotropically branched polymers, isobranched polymers, starburst polymers, and the like) generally are macromolecules which are uniform at the molecular level and have a highly symmetrical structure. Dendrimers are derived structurally from the star polymers, the individual chains in turn each being branched in a star-like manner. They may form from small molecules by a constantly repeating reaction sequence, resulting in one or more branches on the ends of which there are in each case functional groups which in turn are starting points for further branching. Thus, the number of functional terminal groups multiplies with each reaction step. A characteristic feature of the dendrimers is the number of reaction steps (generations) carried out for their synthesis. Owing to their uniform structure, dendrimers can have as a rule a defined molar mass. In some embodiments, the multifunctional boronic crosslinkers may be dendritic-shaped with about 2 to about 10 generations. In another embodiment, the dendritic-shaped multifunctional boronic crosslinkers may have about 2 to about 5 generations. In other embodiments, the dendritic-shaped multifunctional boronic acid crosslinking agents may have a molecular weight between about 1,000 Daltons and 10,000 Daltons.

Star polymers refer to polymers in which three or more chains extend from a center moiety. The center moiety can be a single atom or a group of atoms. Star polymers can be produced either by polymerization from multifunctional cores or by post modification reactions. Polymerization from a multifunctional core may be desirable for high molecular weight polymers. One of ordinary skill in the art, with the benefit of this disclosure, will understand how to apply star polymer synthesis to obtain the multifunctional boronic crosslinkers disclosed herein.

The dendritic or star polymeric multifunctional boronic crosslinkers described in some embodiments herein may comprise any suitable monomer units and/or spacer units (e.g., "R" or "spacer" in Formula I) that result in a water-soluble molecule in addition to one or more boronic acid groups. In some embodiments, the monomer units can be water-soluble monomers. For example, Formula I illustrates a dendritic multifunctional boronic crosslinker with at least one generation that may have up to four boronic acid groups.

In some embodiments with at least 2 generations, the dendritic multifunctional boronic crosslinker may have up to eight boronic acid groups in the outer generation. In addition to the boronic acid group, the spacer units shown in Formula I may comprise a polymer or oligomer synthesized from at least one water-soluble monomer.

In general, the boronic acid group comprises the formula $R-B-(OH)_2$, and may be derived from a boronate ester, for example. Water-soluble monomers that may be suitable as the "R" or "spacer" units in the dendritic multifunctional boronic crosslinkers may include, but are not limited to, acrylamide; 2-acrylamido-2-methyl propane sulfonic acid; N,N-dimethylacrylamide; vinyl pyrrolidone; dimethylaminoethyl methacrylate; acrylic acid; dimethylaminopropylmethacrylamide; vinyl amine; vinyl acetate; trimethylammoniumethyl methacrylate chloride; methacrylamide; hydroxyethyl acrylate; vinyl sulfonic acid; vinyl phosphonic acid; vinylbenzene sulfonic acid; methacrylic acid; vinyl caprolactam; N-vinylformamide; diallyl amine; N,N-diallylacetamide; dimethyldiallyl ammonium halide; itaconic acid; styrene sulfonic acid; methacrylamidoethyltrimethyl ammonium halide; a quaternary salt derivative of an acrylamide; a quaternary salt derivative of an acrylic acid; an alkyl acrylate; an alkyl methacrylate; alkyl acrylamide; alkyl methacrylamide; alkyl dimethylammoniumethyl methacrylate halide; alkyl dimethylammoniumethyl methacrylamide halide; alkyl dimethylammoniumpropyl methacrylamide halide; alkyl dimethylammoniumpropyl methacrylate halide; any derivative thereof, and any combination thereof. Suitable spacer units may also comprise any suitable linkage moieties, including but not limited to, an amide; an ester; an ether; a phosphate ester; an acetal; a ketal; an orthoester; a carbonate; an anhydride; a silyl ether; an alkene oxide; an imine; an ether ester; an ester amide; an ester urethane; a carbonate urethane; an amino acid; an alkane; a polyethylene amine; a polyethylene oxide; a polyester; polycarbonate; polyurethane; polyphosphate ester; a polyamide; a polyacetal; a polyketal; a polyorthoester; a polyanhydride; a polysilyl ether; a poly(alkene oxide); a polyether; a polyimine; a poly(ether ester); a poly(ester amide); a poly(ester urethane); a poly(carbonate urethane); a poly(amino acid); poly(vinyl imidazole); any derivative thereof; and any combination thereof. As used herein, the term "derivative" refers to any compound that is made from one of the listed compounds, for example, by replacing one atom in one of the listed compounds with another atom or group of atoms, ionizing one of the listed compounds, or creating a salt of one of the listed compounds.

In addition to the water-soluble monomers described above for use in some embodiments herein, one or more hydrophobic and/or hydrophilic monomer or polymer units comprising hydrophobic monomers may also be present, so long as any hydrophobic monomer units do not interfere with the water solubility of the molecule. In some embodiments, the dendritic or star multifunctional boronic crosslinkers may have a ratio of boronic acid groups to monomers in the range of from a lower limit of about 1:210, 1:240, 1:270, 1:300, 1:330, 1:360, 1:390, 1:420, 1:450, 1:480, and 1:510 to an upper limit of about 1:800, 1:770, 1:740, 1:710, 1:680, 1:650, 1:620, 1:590, 1:560, 1:530, and 1:500. In some exemplary embodiments, the selected ratio may be about 1:266, 1:356, 1:535, 1:625, or 1:715. Therefore, the embodiments herein may comprise multifunctional boronic crosslinkers having a particularly low boronic acid content without compromising their crosslinking and/or friction reducing qualities.

In some embodiments, the multifunctional boronic crosslinker may be a di-functionalized or tri-functionalized molecule. By way of example, an exemplary structure of a di-functionalized boronic crosslinker is shown in Formula II.

Formula II

In Formula II, $R_1$ and/or the spacer units, alone or in combination, may be a functional group, a monomer, and/or a polymer with an average molecular weight in the range of about 200 Daltons to about 2,000,000 Daltons. The spacer units may be a small oligomer, a functional group, or a polymer suitable for connecting the monomer or polymer $R_1$ to at least one boronic acid group. Suitable spacer units can comprise any suitable moieties, including but not limited to, an amide group; an ester group; an ether group; and any combination thereof. Suitable polymers useful as spacer units may include, but are not limited to, a polyalphaolefin; a polyaryletherketone; a polybutene; a polyimine; a polycarbonate; a polyester; an aromatic polyamide; an ethylene vinyl acetate polymer; a polyacetal; a polyethylene; a polyethylene oxide; a polypropylene; a polymethylpentene; a polyphenylene oxide; a polystyrene; any derivative thereof; and any combination thereof. In some embodiments, the multifunctional boronic crosslinkers of the general structure shown in Formula II may be water-soluble, comprising, where appropriate, any of the water-soluble monomer(s) disclosed above with reference to the dendritic multifunctional boronic crosslinkers. In some embodiments, a di-functional or tri-functional boronic crosslinker disclosed herein (as discussed above, collectively referred to herein as multifunctional boronic crosslinkers) may have a ratio of boronic acid groups to monomers in the range of from a lower limit of about 1:210, 1:240, 1:270, 1:300, 1:330, 1:360, 1:390, 1:420, 1:450, 1:480, and 1:510 to an upper limit of about 1:800, 1:770, 1:740, 1:710, 1:680, 1:650, 1:620, 1:590, 1:560, 1:530, and 1:500. In some exemplary embodiments, the selected ratio may be about 1:266, 1:356, 1:535, 1:625, or 1:715. Therefore, the embodiments herein may comprise multifunctional boronic crosslinkers having a particularly low boronic acid content without compromising their crosslinking and/or friction reducing qualities.

The multifunctional boronic crosslinkers may also be a copolymer. Suitable copolymer structures can include, but are not limited to, the structure generally represented by Formula III, where X represents a functional group bound to a monomer unit of the polymer backbone. Although Formula III as shown indicates a regular spacing between boronic acid monomers, it is to be recognized that the spacing of boronic acid monomers can be regular in some embodiments or random in other embodiments.

Formula III

In some embodiments, the polymeric multifunctional boronic crosslinker may be a block copolymer including, but not limited to, a diblock, triblock, or multiblock copolymer. An exemplary embodiment of a suitable diblock copolymer structure may include, but is not limited to, the structure represented by Formula IV.

Formula IV

The copolymers and block copolymers of Formulas III and IV may have an average molecular weight in the range of from about 1,000 Daltons to about 2,000,000 Daltons. The copolymers and block copolymers of Formulas III and IV may be formed by a polymerization reaction of a boronic acid monomer and a water-soluble monomer. Formulas III and IV illustrate that a boronic functional group may be directly bonded to the backbone of the polymer and/or the boronic functional group may be connected to the backbone of the polymer with an intervening spacer group between the boronic functional group and the backbone of the polymer.

In general, in some embodiments, the boronic acid monomer may comprise a vinyl, allyl or acrylic functional group. In some embodiments, the boronic acid monomer may comprise an aryl boronic acid or particularly a vinyl boronic acid. In other embodiments, the boronic acid monomer may comprise an alkyl, alkenyl, or alkynyl boronic acid (i.e., aliphatic boronic acids). It should be noted that the classification of a boronic acid as allyl, aryl, alkyl, alkenyl, or alkynyl for use as the boronic acid monomer described herein, refers to the point of attachment of the boronic acid group. That is, for example, an aryl boronic acid has a boronic acid group or a boronate ester derivative thereof attached to an aryl ring, and an alkenyl boronic acid has a boronic acid or boronate ester derivative thereof attached to an alkenyl group. The boronic acid monomers and the boronic acid groups, as described herein, may have additional functionality elsewhere in the molecule that is not attached to the boronic acid functionality. For example, an aryl boronic acid can have an alkenyl functionality elsewhere in the molecule that is not attached to the boronic acid functionality. Suitable boronic acid monomers may be any acrylamide boronic acid monomer. Specific examples of suitable boronic acid monomers include, but are not limited to, 3-acrylamidophenyl boronic acid monomer; 2-acrylamidophenylboronic acid monomer; 4-acrylamido phenyl boronic acid; 2-((2-acrylamidoethylamino)methyl)phenyl boronic acid; any derivative thereof; and any combination thereof.

Water-soluble boronic monomers for use in the polymeric multifunctional boronic crosslinkers disclosed herein include, but are not limited to, Water-soluble monomers that may be suitable as the "R" or "spacer" units in the dendritic multifunctional boronic crosslinkers include, but are not limited to, acrylamide; 2-acrylamido-2-methyl propane sulfonic acid; N,N-dimethylacrylamide; vinyl pyrrolidone; dimethylaminoethyl methacrylate; acrylic acid; dimethylaminopropylmethacrylamide; vinyl amine; vinyl acetate; trimethylammoniumethyl methacrylate chloride; methacrylamide; hydroxyethyl acrylate; vinyl sulfonic acid; vinyl phosphonic acid; vinylbenzene sulfonic acid; methacrylic acid; vinyl caprolactam; N-vinylformamide; diallyl amine; N,N-diallylacetamide; dimethyldiallyl ammonium halide; itaconic acid; styrene sulfonic acid; methacrylamidoethyltrimethyl ammonium halide; a quaternary salt derivative of an acrylamide; a quaternary salt derivative of an acrylic acid; an alkyl acrylate; an alkyl methacrylate; alkyl acrylamide; alkyl methacrylamide; alkyl dimethylammoniumethyl methacrylate halide; alkyl dimethylammoniumethyl methacrylamide halide; alkyl dimethylammoniumpropyl methacrylamide halide; alkyl dimethylammoniumpropyl methacrylate halide; any derivative thereof, and any combination thereof. Other functional groups can also be present along the polymer backbone. In some embodiments, the boronic acid functional group can be grafted onto an already formed polymer backbone using techniques known to one having ordinary skill in the art. In some embodiments, as generally represented by Formulas III and VI, the ratio of the boronic acid monomer units to the other monomer units in the polymer may range from a lower limit of about 1:210, 1:240, 1:270, 1:300, 1:330, 1:360, 1:390, 1:420, 1:450, 1:480, and 1:510 to an upper limit of about 1:800, 1:770, 1:740, 1:710, 1:680, 1:650, 1:620, 1:590, 1:560, 1:530, and 1:500. In some exemplary embodiments, the selected ratio may be about 1:266, 1:356, 1:535, 1:625, or 1:715. Therefore, the embodiments herein may comprise multifunctional boronic crosslinkers having a particularly low boronic acid content without compromising their crosslinking and/or friction reducing qualities.

In some embodiments, the multifunctional boronic crosslinkers may comprise an equilibrium species. For example, the multifunctional boronic crosslinkers may become protonated or deprotonated depending on pH. This feature can influence their solubility in a treatment fluid. Likewise, intramolecular interactions between atoms in the multifunctional boronic crosslinkers and the geometry of boron (e.g., tetrahedral or trigonal planar) may depend on pH and/or solvent (e.g., an alcohol-based solvent such as methanol). Thus, the exact chemical composition and geometry of the multifunctional boronic crosslinkers may depend on a particular equilibrium known to one of ordinary skill in the art. The geometry can also depend on the neighboring group participation in changing the steoreochemistry. For example, a nitrogen atom present in a neighboring group may share its lone pair of electrons with a boron to result in a tetrahedral geometry, which can allow for the formation of a bond to hydroxyl groups at a relatively neutral pH.

Formula V illustrates an exemplary embodiment of the multifunctional boronic crosslinkers disclosed herein.

Formula V

In some embodiments, the multifunctional boronic crosslinker may be prepared by incorporation of one or more of the water-soluble monomers listed above in the polymer synthesis with a boronic acid monomer. For example, a multifunctional boronic crosslinker according to exemplary Formula V may be prepared by copolymerizing 2-acrylamidophenylboronic acid with N,N-dimethylacrylamide in the ratio of about 1:210 to about 1:800 (e.g., a ratio of x:y ranging from a lower limit of about 1:210, 1:240, 1:270, 1:300, 1:330, 1:360, 1:390, 1:420, 1:450, 1:480, and 1:510 to an upper limit of about 1:800, 1:770, 1:740, 1:710, 1:680, 1:650, 1:620, 1:590, 1:560, 1:530, and 1:500 in exemplary Formula V) by free radical polymerization to provide the multifunctional boronic crosslinker. In some exemplary embodiments, the selected ratio may be about 1:266, 1:356, 1:535, 1:625, or 1:715. Therefore, the embodiments herein may comprise multifunctional boronic crosslinkers having a particularly low boronic acid content without compromising their crosslinking and/or friction reducing qualities. The boronic acid group can also be attached to a preexisting water-soluble polymer by known chemistry.

In another exemplary embodiment, the multifunctional boronic crosslinker may comprise a compound represented by Formula VI.

Exemplary Formula VI

In this embodiment, R may be hydrogen or a methyl group, y may vary from about 210 to about 800, and x may vary such that the ratio of the x:y ranges from a lower limit of about 1:210, 1:240, 1:270, 1:300, 1:330, 1:360, 1:390, 1:420, 1:450, 1:480, and 1:510 to an upper limit of about 1:800, 1:770, 1:740, 1:710, 1:680, 1:650, 1:620, 1:590, 1:560, 1:530, and 1:500. In an exemplary embodiment, a multifunctional boronic crosslinker according to Formula VI may be prepared by copolymerizing 2-((2-acrylamidoethylamino)methyl)phenylboronic acid with N,N-dimethylacrylamide in the ratio of about 1:210 to about 1:800 by free radical polymerization to provide the multifunctional boronic crosslinker. In another exemplary embodiment, a multifunctional boronic crosslinker according to Formula VI may be prepared by copolymerizing 2-((2-acrylamidoethylamino)methyl)phenylboronic acid with an acrylamide in the ratio of about 1:210 to about 1:800 by free radical polymerization to provide the multifunctional boronic crosslinker. In some exemplary embodiments, the selected ratio may be about 1:266, 1:356, 1:535, 1:625, or 1:715. Therefore, the embodiments herein may comprise multifunctional boronic crosslinkers having a particularly low boronic acid content without compromising their crosslinking and/or friction reducing qualities.

In still another illustrative embodiment, the multifunctional boronic acid crosslinker can be a di-functional boronic crosslinking agent having Formula XI, where u is an integer and R comprises a carbon, nitrogen, oxygen or sulfur atom. In some embodiments, the di-functional boronic acid crosslinker of Formula VII may be prepared by reacting two mole equivalent of o-boronic aldehyde with one mole equivalent of olegomeric ethyleneoxide diamine or olegomeric ethylenediamine, followed by reduction. In another embodiment, R may be an O or NH, and the di-functional boronic acid crosslinker of Formula XI may be prepared by reacting two equivalents of 2-formylphenylboronic acid with one equivalent of oligomeric ethylene oxide or oligomeric ethylenediamine, followed by reduction of the intermediate imine.

Exemplary Formula VII

R = O, N
n = 1-1000

One of ordinary skill in the art, with the benefit of this disclosure, may synthesize the multifunctional boronic crosslinkers disclosed herein using known materials and the relevant methods of preparative organic chemistry.

The multifunctional boronic crosslinkers described in the embodiments herein may be provided or used in any suitable form. For instance, the multifunctional boronic crosslinkers may be a liquid, a gel, an emulsion, or a solid. The form of the multifunctional boronic crosslinkers may depend on the specific choice of the multifunctional boronic crosslinkers. For example, in certain embodiments, the multifunctional boronic crosslinkers may be added in a quantity beyond the solubility limit in an aqueous fluid and thus, not be in an aqueous form. In other embodiments, the multifunctional boronic crosslinkers may be dissolved, suspended, or emulsified in a liquid.

In other embodiments, the multifunctional boronic crosslinkers may be used in a form that allows for a delayed release of the multifunctional boronic crosslinker, particularly within a subterranean operation. Delayed release may be desirable when a subterranean operation involves high temperature conditions, and release of the multifunctional boronic crosslinker may be desired after these high temperature conditions occur. For example, in a non-limiting embodiment, in wells with temperatures that require a second crosslinking agent to be present, the multifunctional boronic crosslinkers may be tailored to become available for crosslinking when a first crosslinking agent fails (e.g., at temperatures in which a conventional metal crosslinker fails). Delayed release may also be desirable in a deep well or in a well requiring a long pump time. In this regard, multifunctional boronic crosslinkers that contain at least some boronate ester derivatives may be advantageous, since boronic acid groups do not become available for crosslinking until hydrolysis of the boronate ester derivatives occurs. In certain embodiments, the multifunctional boronic crosslinkers may be encapsulated or enclosed within an outer coating that is capable of degrading at a desired time or allowing the slow diffusion of the multifunctional boronic crosslinkers. In some embodiments, the crosslinking of a fluid can also be delayed by preparing the fluid at a low pH and adding an encapsulated pH adjusting agent that can raise the pH of the treatment fluid for crosslinking. A person having ordinary skill in the art, with the benefit of this disclosure, will recognize the appropriate delayed release technique (e.g., encapsulation), if any, to use with the multifunctional boronic crosslinkers disclosed herein.

In certain embodiments in which the multifunctional boronic crosslinkers are encapsulated, the multifunctional boronic crosslinkers may comprise a coating or like containment means (e.g., to delay the release of the multifunctional boronic crosslinker). In general, suitable coating or containment materials may be degradable materials in which the products of the degradation do not adversely affect the multifunctional boronic crosslinkers. As used herein, the term "degradable" and all of its variants (e.g., "degradation") refers to both the two relatively extreme cases of hydrolytic degradation that the degradable material may undergo, i.e., heterogeneous (or bulk erosion) and homogeneous (or surface erosion), and any stage of degradation in between these two. Examples of degradable materials that can be used as a coating or containment in conjunction with the multifunctional boronic crosslinkers described herein include, but are not limited to, polysaccharides (e.g., dextran or cellulose); chitins; chitosans; proteins; aliphatic polyesters; poly(lactides); poly(glycolides); poly(ε-caprolactones); poly(hydroxybutyrates); poly(anhydrides); aliphatic polycarbonates; orthoesters; poly(orthoesters); poly(amino acids); poly(ethylene oxides); poly(phosphazenes); any derivative thereof; and any combination thereof. Other suitable degradable polymers include, for example, heat-sealable materials, other thermoplastic materials, or materials that can be dissolved with an appropriate solvent (e.g., hydroxypropylmethylcellulose, pectin, polyethylene oxide, polyvinyl alcohol, alginate, polycaprolactone, gelatinized starch-based materials, and the like). In certain exemplary embodiments, blends of these materials can be used.

The multifunctional boronic crosslinkers described in some embodiments herein may be used to form a crosslinked gelling agent (e.g., in a treatment fluid). Under appropriate conditions (e.g., pH and temperature), the multifunctional boronic crosslinkers may allow one or more crosslinks to form between at least two gelling agent molecules. In addition, in some embodiments, treatment fluids comprising a multifunctional boronic crosslinker may exhibit viscoelastic behavior and can be broken using a pH shift to a less basic environment and reversibly formed by changing the pH back to a more basic environment.

The multifunctional boronic crosslinker of some embodiments herein may be used to crosslink gelling agent molecules to form a viscosified treatment fluid and at the same time provide friction reduction properties. The multifunctional boronic crosslinker generally may be present in an amount sufficient to provide the desired viscosity and friction reducing properties in the treatment fluid. In some embodiments, the multifunctional boronic crosslinker increases the viscosity of the treatment fluid by a factor of at least about 10 compared to the treatment fluid without the multifunctional boronic crosslinker. In other embodiments, the treatment fluid may have a final viscosity, after inclusion of the multifunctional boronic crosslinker in the range of from about 200 cP to about 5000 cP. In certain embodiments, the multifunctional boronic crosslinker may be present in the treatment fluid in an amount in the range of from about 0.003% to about 1% by weight of the aqueous base fluid therein. In some embodiments, the multifunctional boronic crosslinker can be added to a treatment fluid in an amount ranging from about 0.05 pounds per 1,000 gallons of treatment fluid ("0.05 lb/Mgal") to about 85 lb/Mgal. In another embodiment, the multifunctional boronic crosslinker may be added to a treatment fluid in an amount ranging from about 1 lb/Mgal to about 50 lb/Mgal. The amount of multifunctional boronic crosslinker added to the treatment fluid may depend on the gelling agents used, the structure of the multifunctional boronic crosslinker, the average molecular weight of the multifunctional boronic crosslinker, the number of boronic acid functional groups therewithin, the amount of friction reduction required for a particular subterranean operation, and the like.

A variety of gelling agents may be used in the treatment fluids described herein. Suitable gelling agents typically may comprise biopolymers; synthetic polymers; and any combination thereof. Without wishing to be limited by any particular theory, it is believed that in certain embodiments, a boronic acid group in a multifunctional boronic crosslinker may form a crosslink with suitably oriented hydroxyl groups on a gelling agent molecule. Remaining unbound by theory or mechanism, it is believed that hydroxyl groups oriented in a 1,2-arrangement on the gelling agent may be particularly well oriented to react with the multifunctional boronic crosslinker. For example, in some embodiments, it is believed that a boronate ester linkage may be formed between the gelling agent and the multifunctional boronic crosslinker. In some embodiments, a multifunctional boronic crosslinker containing at least some boronate esters can react with a gelling agent through ester exchange reactions to form crosslinks. That is, it may not be necessary for a multifunctional boronic crosslinker containing boronate esters to first be hydrolyzed to a free boronic acid.

In some embodiments, suitable gelling agents may be biopolymers comprising polysaccharides, and derivatives thereof, including those that have one or more of the following monosaccharide units: galactose, mannose, glucoside, glucose, xylose, arabinose, fructose, glucuronic acid, or pyranosyl sulfate. Examples of suitable biopolymers can include, but are not limited to, guar, guar gum and derivatives thereof (e.g., hydroxypropyl guar and carboxymethylhydroxypropyl guar), cellulose and cellulose derivatives (e.g., carboxymethyl cellulose, carboxymethyl cellulose, and hydroxyethyl cellulose), and xanthan and derivatives thereof. In some embodiments, the gelling agent, particularly a biopolymer, can be at least partially depolymerized. The term "depolymerized," as used herein, generally refers to a decrease in the molecular weight of the gelling agent molecule by removal of at least some of its monomer units.

In some embodiments, the gelling agent may comprise a water-soluble synthetic polymer. In some embodiments, the gelling agent may be a synthetic polymer containing hydroxyl groups such as, for example, polyvinyl alcohol. Synthetic polymers may be prepared by any suitable monomers known in the art, including those useful for forming the multifunctional boronic crosslinkers. In some embodiments, suitable monomers useful in forming a synthetic polymer useful as a gelling agent can include, but are not limited to, acrylamide; 2-acrylamido-2-methyl propane sulfonic acid; N,N-dimethylacrylamide; vinyl pyrrolidone; dimethylaminoethyl methacrylate; acrylic acid; dimethylaminopropylmethacrylamide; vinyl amine; vinyl acetate; trimethylammoniumethyl methacrylate chloride; methacrylamide; hydroxyethyl acrylate; sulfonic acid; vinyl phosphonic acid; vinylbenzene sulfonic acid; methacrylic acid; vinyl caprolactam; N-vinylformamide; diallyl amine; N,N-diallylacetamide; dimethyldiallyl ammonium halide; itaconic acid; styrene sulfonic acid; methacrylamidoethyltrimethyl ammonium halide; a quaternary salt derivative of an acrylamide; a quaternary salt derivative of an acrylic acid; an alkyl acrylate; an alkyl methacrylate; alkyl acrylamide; alkyl methacrylamide; alkyl dimethylammoniumethyl methacrylate halide; alkyl dimethylammoniumethyl methacrylamide halide; alkyl dimethylammoniumpropyl methacrylamide halide; alkyl dimethylammoniumpropyl methacrylate halide; any derivative thereof, and any combination thereof. In some embodiments, these monomers and others may be copolymerized with monomers that contain hydroxyl groups suitable for crosslinking with a multifunctional boronic crosslinker. Illustrative synthetic polymers that can include the foregoing water-soluble monomers include, but are not limited to, polyacrylates; polymethacrylates; polyacrylamides; polyvinyl alcohol; polyvinylpyrrolidone; any copolymers thereof; and any combination thereof.

In certain embodiments, the gelling agent can be present in a treatment fluid in an amount ranging from about 0.1% to about 10% by weight of the aqueous base fluid therein. In certain embodiments, the gelling agent can be present in the treatment fluid in an amount ranging from about 0.2% to about 4% by weight of the aqueous base fluid therein.

In some embodiments, the treatment fluids of some embodiments disclosed here may further comprise a solubilizing agent that comprises at least two hydroxyl groups. In some embodiments, at least a portion of the boronic acid monomer in a multifunctional boronic crosslinker may be functionalized with the solubilizing agent to form a boronate ester. Without being bound by theory or mechanism, it is believed that a solubilizing agent having at least two hydroxyl groups disposed such that they can form a 5- or 6-membered ring boronate ester with a boronic acid monomer may be particularly effective. Although any compound can be used that can form a 5- or 6-membered ring boronate ester, it is generally preferred that the compound contain functionality that further facilitates the water solubility of the multifunctional boronic crosslinker. Generally, functionalities that can facilitate water solubility may include, but are not limited to, hydroxyl groups; amines; carboxylic acid groups; and any combination thereof. Other suitable solubilizing agents may include, but are not limited to, a short chain polyol (e.g., glycerol, erythritol, pentaerythritol, and the like); a polysaccharide (e.g., sucrose, glucose, fructose, sorbitol, and the like); an amino sugar; a sugar alcohol; a sugar acid; a polyvinyl alcohol; a tartaric acid; a catechol; a glycol (e.g., ethylene glycol, propylene glycol, and the like); any derivative thereof; and any combination thereof. In addition to the possible formation of a boronate ester, the solubilizing agent may also promote solubility by acting as a co-solvent and/or lowering the interfacial tension between water and the boronic acid monomers. That is, in some embodiments, more than a stoichiometric amount of solubilizing agent may be used relative to the boronic acid monomers. In some embodiments, the solubilizing agent may be present in the range of from about 0.1 mole % to about 10 mole % with respect to the molarity of the boronic acid monomer.

In some embodiments, the treatment fluids disclosed herein comprising the multifunctional boronic crosslinkers may further comprise additional crosslinking agents. As used herein, the term "crosslinking agent" excludes the multifunctional boronic crosslinkers disclosed in the embodiments herein and refers to traditional metal crosslinking agents, including those comprising boron. Such crosslinking agents may also function to crosslink one or more molecules of gelling agents and may operate synergistically with the multifunctional boronic crosslinker, such as by the delayed mechanism discussed above. Examples of suitable crosslinking agents include, but are not limited to, borate ions; magnesium ions; zirconium IV ions; titanium IV ions; aluminum ions; antimony ions; chromium ions; iron ions; copper ions; magnesium ions; zinc ions; and any combination thereof. These ions may be provided by providing any compound that is capable of producing one or more of these ions. Examples of such compounds include, but are not limited to, ferric chloride; boric acid; disodium octaborate tetrahydrate; sodium diborate; pentaborates; ulexite; colemanite; magnesium oxide; zirconium lactate; zirconium triethanol amine; zirconium lactate triethanolamine; zirconium carbonate; zirconium acetylacetonate; zirconium malate; zirconium citrate; zirconium diisopropylamine lactate; zirconium glycolate; zirconium triethanol amine glycolate; zirconium lactate glycolate; titanium lactate; titanium malate; titanium citrate; titanium ammonium lactate; titanium triethanolamine; titanium acetylacetonate; aluminum lactate; aluminum citrate; antimony compounds; chromium compounds; iron compounds; copper compounds; zinc compounds; and any combination thereof. In some embodiments, these crosslinking agents are optimal at certain pH values, for example pH 8. One of ordinary skill in the art will recognize when such pH adjustments are necessary.

When included, suitable crosslinking agents may be present in the treatment fluids in an amount sufficient to provide the desired degree of crosslinking between molecules of the gelling agent in combination with the crosslinking provided by the multifunctional boronic crosslinker. In certain embodiments, the crosslinking agent may be present in the treatment fluids in an amount in the range of from about 0.005% to about 1% by weight of the aqueous base fluid. In certain embodiments, the crosslinking agent may be present in the treatment fluids in an amount in the range of from about 0.05% to about 1% by weight of the aqueous base fluid.

In some applications, the treatment fluids disclosed herein that have been viscosified by the inclusion of a multifunctional boronic crosslinker may desirably have such viscosification reduced (i.e., thinning the treatment fluid) after they have been used for their intended purpose, such as to more easily remove the treatment fluids from a subterranean formation. Reducing the viscosity of a treatment fluid comprising the multifunctional boronic acid may be achieved by adjusting the pH of the treatment fluid so that crosslinks between gelling agent molecules become unstable or "delink." The terms "delink" or "delinking" refer to the reversible removal of crosslinks between at least two molecules that are crosslinked (e.g., crosslinked gelling agent molecules).

Although crosslinks between gelling agent molecules and the multifunctional boronic crosslinkers may be delinked by changing the pH, any breaker may be used with the treatment fluids of the embodiments disclosed herein. The term "breaker" refers to an agent that is capable of reducing the viscosity of a treatment fluid. For example, any breaker that is an acid, oxidizer, or enzyme known in the art may be used with the treatment fluids described herein. Suitable acid breakers may include mineral acids such as, for example, hydrochloric acid, sulfuric acid, or nitric acid. Suitable oxidizers may include, for example, persulfates, peroxides, and hypochlorites. In some embodiments, the breaker may be a delayed breaker such as a delayed release acid capable of lowering the pH of the treating fluid. Examples of delayed breakers which may be used include, but are not limited to, various lactones, esters, encapsulated acids and slowly soluble acid generating compounds, oxidizers which produce acids upon reaction with water, water reactive metals such as aluminum, lithium and magnesium and the like. The breaker may be included in the treatment fluid in an amount in the range of from about 0%, 0.1%, 0.2%, 0.3%, 0.4%, and 0.5% to about 1%, 0.9%, 0.8%, 0.7%, 0.6%, and 0.5% by weight of the aqueous base fluid therein. Enzyme breakers capable of generating acids can also be employed including, for example, alpha and beta amylases, amyloglucosidase, invertase, maltase, cellulose and hemi-cellulose. The specific delayed breaker used, whether or not it is encapsulated, as well as the amount thereof employed may depend upon the breaking time desired, the nature of the gelling agent and the multifunctional boronic crosslinker, subterranean formation characteristics and conditions, and the like.

The treatment fluids disclosed herein also may comprise pH-adjusting agents. The pH-adjusting agents may be included in the treatment fluids to adjust the pH of the treatment fluids, inter alia, to facilitate the formation or delinking of crosslinks between gelling agent molecules. In some embodiments, the multifunctional boronic crosslinkers may not be capable of forming crosslinks between gelling agent molecules in acidic environments (e.g., at or below a pH ranging from about 6.0 to 7.0). Therefore, crosslinking or delinking may occur by adjusting the pH of the treatment fluid once it is placed in a desired location (e.g., in a well bore penetrating a subterranean formation). In certain embodiments in which the pH is to be increased (e.g., to facilitate crosslinking), suitable pH-adjusting agents may comprise a base. Examples of suitable bases can include, but are not limited to, sodium hydroxide; potassium hydroxide; lithium hydroxide; sodium carbonate; potassium carbonate; ammonium hydroxide; and any combination thereof. In other embodiments in which the pH is to be decreased (e.g., to facilitate delinking), suitable pH-adjusting agents may include, but are not limited to, fumaric acid; formic acid; acetic acid; acetic anhydride; hydrochloric acid; sulfuric acid; hydrofluoric acid; hydroxyfluoroboric acid; polyaspartic acid; polysuccinimide; and any combination thereof. The identity and amount of the pH-adjusting agent may depend on, for example, the subterranean formation characteristics and conditions, the breaking or crosslinking time desired, and the nature of the multifunctional boronic crosslinker, and the like.

In some embodiments, the multifunctional boronic crosslinkers may be crosslinked at a lower pH by inserting an electron withdrawing group in the multifunctional boronic crosslinker so that the pKa of the boronic acid group can be lowered. Without being bound by theory or mechanism, it is believed that an electron withdrawing group (e.g., a nitro group or a halogen) may remove electron density from the boronic acid group, thereby making it more acidic. In some embodiments, the multifunctional boronic crosslinker may comprise a monomer or functional group capable of changing the geometry of the boronic acid group from a planar configuration to a tetrahedral configuration. For example, an appropriately located nitrogen atom may donate its lone pair of electrons to the open p-orbital on boron, thereby forming a tetrahedral complex. Formation of the complex may allow the multifunctional boronic crosslinker to crosslink in a treatment fluid at a lower pH. In some embodiments, a treatment fluid having a tetrahedral boronic acid complex can be crosslinked at a pH ranging from about 5 to about 8.

In addition, the treatment fluids in some embodiments disclosed herein may further comprise a buffer. Buffers may be used to maintain a treatment fluid's pH in a limited range. Examples of suitable buffers may include, but are not limited to, sodium carbonate, potassium carbonate, sodium bicarbonate, potassium bicarbonate, sodium or potassium diacetate, sodium or potassium phosphate, sodium or potassium hydrogen phosphate, sodium or potassium dihydrogen phosphate, and the like. When used, the buffer may be included in an amount sufficient to maintain the pH of the treatment fluids at a desired level. In some embodiments, the buffer may be included in an amount in the range of from about 0.5% to about 10% by weight of the aqueous base fluid therein. One of ordinary skill in the art, with the benefit of this disclosure, will recognize the appropriate buffer and amount to use for a chosen application.

The treatment fluids disclosed herein may optionally comprise particulates (e.g., proppant particulates or gravel particulates). In some embodiments, the particulates (e.g., proppant particulates) may be included into the treatment fluids, which may be introduced into a subterranean formation at a rate and pressure sufficient to create or enhance at least one fracture therein, such that the particulates are placed within the fracture to form a proppant pack therein through which produced fluids may flow. Particulates suitable for use in the embodiments described herein may comprise any material suitable for use in subterranean operations. Suitable materials for these particulates may include, but are not limited to, sand; bauxite; ceramic materials; glass materials; polymer materials; polytetrafluoroethylene materials; nut shell pieces; cured resinous particulates comprising nut shell pieces; seed shell pieces; cured resinous particulates comprising seed shell pieces; fruit pit pieces; cured resinous particulates comprising fruit pit pieces; wood; composite particulates; and any combination thereof. Suitable composite particulates may comprise a binder and a filler material, wherein suitable filler materials may include, but are not limited to silica; alumina; filmed carbon; carbon black; graphite; mica; titanium dioxide; meta-silicate; calcium silicate; kaolin; talc; zirconia; boron; fly ash; hollow glass microspheres; solid glass; and any combination thereof. The particulate size generally may range from about 2 mesh to about 400 mesh or less on the U.S. Sieve Series; however, in certain circumstances, other sizes or mixtures of sizes may be desired and will be entirely suitable for practice of the embodiments described herein. In some embodiments, the particulate size distribution range may be one or more of 6/12, 8/16, 12/20, 16/30, 20/40, 30/50, 40/60, 40/70, or 50/70 mesh. It should be understood that the term "particulate," as used in this disclosure, includes all known shapes of materials, including substantially spherical materials, fibrous materials, polygonal materials (such as cubic materials), and mixtures thereof. Moreover, fibrous materials, that may or may not be used to bear the pressure of a closed fracture, may be included in certain embodiments. In certain embodiments, the particulates included in the treatment fluids may be coated with any suitable resin or tackifying agent known to one having ordinary skill in the art. In certain embodiments, the particulates may be present in a treatment fluid in an amount in the range of from about 0.5 pounds per gallon ("ppg") to about 30 ppg by volume of the aqueous base fluid.

Additional additives may be included in the treatment fluids of the embodiments described herein as deemed appropriate by one having ordinary skill in the art and having the benefit of this disclosure. Examples of such additives may include, but are not limited to, fluid loss control agents; surfactants; dispersing agents; weighting agents; scale inhibitors; clay stabilizers; silicate-control agents; antifoaming agents; foaming agents; biocides; biostatic agents; storage stabilizers; and any combination thereof.

The treatment fluids of the embodiments disclosed herein may be used in various subterranean operations, as described in more detail below. In some embodiments, a method is provided comprising introducing a treatment fluid into a subterranean formation comprising an aqueous base fluid, a gelling agent, and a multifunctional boronic crosslinker. The multifunctional boronic crosslinker comprises a dendritic polymer comprising a water-soluble monomer and a boronic acid group, wherein the ratio of the water-soluble monomer to the boronic acid group is in the range of from a lower limit of about 1:210, 1:240, 1:270, 1:300, 1:330, 1:360, 1:390, 1:420, 1:450, 1:480, and 1:510 to an upper limit of about 1:800, 1:770, 1:740, 1:710, 1:680, 1:650, 1:620, 1:590, 1:560, 1:530, and 1:500. In some embodiments, the multifunctional boronic crosslinker comprises a copolymer of a water-soluble monomer and a boronic acid monomer, wherein the ratio of the water-soluble monomer to the boronic acid monomer is in the range of from a lower limit of about 1:210, 1:240, 1:270, 1:300, 1:330, 1:360, 1:390, 1:420, 1:450, 1:480, and 1:510 to an upper limit of about 1:800, 1:770, 1:740, 1:710, 1:680, 1:650, 1:620, 1:590, 1:560, 1:530, and 1:500. In some embodiments, the treatment fluid comprising the aqueous base fluid, the gelling agent, and the multifunctional boronic crosslinker comprising a dendritic polymer comprising a water-soluble monomer and a boronic acid group, wherein the ratio of the water-soluble monomer to the boronic acid group is in the range of from a lower limit of about 1:210, 1:240, 1:270, 1:300, 1:330, 1:360, 1:390, 1:420, 1:450, 1:480, and 1:510 to an upper limit of about 1:800, 1:770, 1:740, 1:710, 1:680, 1:650, 1:620, 1:590, 1:560, 1:530, and 1:500 is disclosed. In other embodiments, the treatment fluid comprising the aqueous base fluid, the gelling agent, and the multifunctional boronic crosslinker comprising a copolymer of a water-soluble monomer and a boronic acid monomer, wherein the ratio of the water-soluble monomer to the boronic acid monomer is in the range of from a lower limit of about 1:210, 1:240, 1:270, 1:300, 1:330, 1:360, 1:390, 1:420, 1:450, 1:480, and 1:510 to an upper limit of about 1:800, 1:770, 1:740, 1:710, 1:680, 1:650, 1:620, 1:590, 1:560, 1:530, and 1:500 is disclosed. In some embodiments, the multifunctional boronic acid crosslinking agent may not comprise a gradient copolymer.

In some embodiments, the treatment fluids of the embodiments disclosed herein be used for carrying out a variety of subterranean operations, such as, for example, drilling operations, lost circulation operations, stimulation operations, acidizing operations, acid-fracturing operations, sand control operations, completion operations, scale inhibiting operations, water-blocking operations, clay stabilizer operations, fracturing operations, frac-packing operations, gravel packing operations, wellbore strengthening operations, sag control operations, and the like. When used in conjunction with fracturing operations, fracturing fluids (i.e., the treatment fluid) comprising an aqueous base fluid, a gelling agent, and a multifunctional boronic crosslinker may be introduced into a subterranean formation at a rate and pressure sufficient to create or enhance at least one fracture therein. Particulates (i.e., proppant particulates) may also be included in the treatment fluid so as to be placed within a newly formed or existing fracture and form a proppant pack. When used in conjunction with a gravel packing operation, gravel packing fluids (i.e., the treatment fluid) comprising an aqueous base fluid, gravel, a gelling agent and a multifunctional boronic acid crosslinker may be placed in or near a portion of a subterranean formation so as to create a gravel pack. After the gravel pack is substantially in place, the viscosity of the gravel packing fluid can be reduced to a desired degree and recovered.

The disclosure also provides methods of reusing treatment fluids or any component, or combination of components, therein. In general, the treatment fluids of the embodiments herein can be reused because gelling agents crosslinked using the multifunctional boronic acid crosslinkers can be delinked, as discussed above. In certain embodiments, reuse of the treatment fluids of the embodiments herein may involve delinking the gelling agents to a sufficient degree so as to remove the crosslinks to at least one gelling agent molecule thereby forming a "delinked gelling agent." These delinked gelling agents may be re-crosslinked again (e.g., to increase the viscosity of the same or a different treatment fluid) in another operation. In certain embodiments, one or more components of a treatment fluid comprising delinked gelling agents may be reused. For example, the gelling agent or the aqueous base fluid of the treatment fluids may be reused. When additives are included in the treatment fluids of the embodiments disclosed herein, those too may be reused, provided that they may be recovered from the treatment fluid by conventional means.

In various embodiments, systems configured for delivering the treatment fluids described herein to a downhole location are described. In various embodiments, the systems can comprise a pump fluidly coupled to a tubular, the tubular containing a treatment fluid comprising the multifunctional boronic crosslinkers.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluid to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluid to the high pressure pump. In such embodiments, the low pressure pump may "step up" the pressure of the treatment fluid before it reaches the high pressure pump.

In some embodiments, the systems described herein can further comprise a mixing tank that is upstream of the pump and in which the treatment fluid is formulated. In various embodiments, the pump (e.g., a low pressure pump, a high pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

Figure 2:
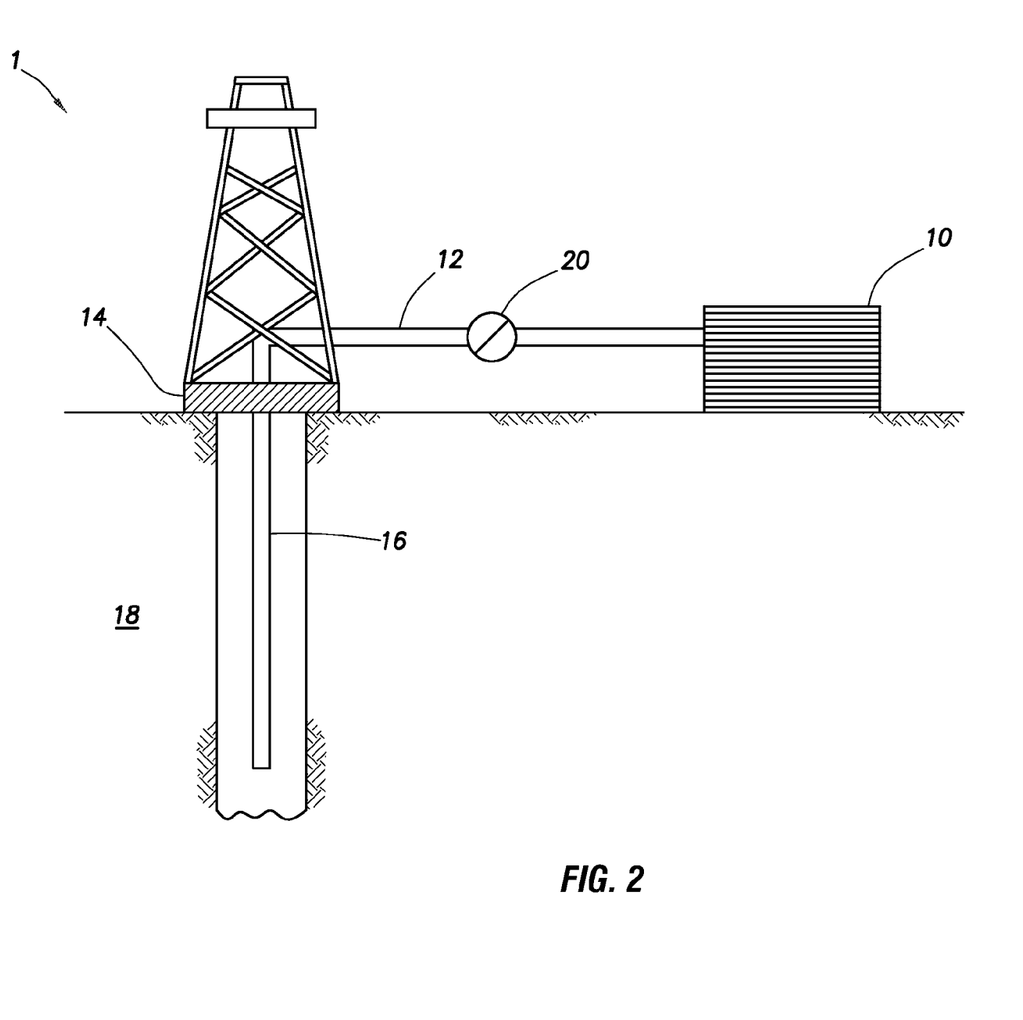
FIG. 2 depicts an embodiment of a system configured for delivering the treatment fluids comprising the multifunctional boronic crosslikers of the embodiments described herein to a downhole location.

FIG. 2 shows an illustrative schematic of a system that can deliver treatment fluids of the embodiments herein to a downhole location, according to one or more embodiments. It should be noted that while FIG. 2 generally depicts a land-based system, it is to be recognized that like systems may be operated in subsea locations as well. As depicted in FIG. 2, system 1 may include mixing tank 10, in which a treatment fluid of the embodiments may be formulated. The treatment fluid may be conveyed via line 12 to wellhead 14, where the treatment fluid enters tubular 16, tubular 16 extending from wellhead 14 into subterranean formation 18. Upon being ejected from tubular 16, the treatment fluid may subsequently penetrate into subterranean formation 18. Pump 20 may be configured to raise the pressure of the treatment fluid to a desired degree before its introduction into tubular 16. It is to be recognized that system 1 is merely exemplary in nature and various additional components may be present that have not necessarily been depicted in FIG. 2 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 2, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 2.

Embodiments disclosed herein include:

A. A method comprising: providing a treatment fluid comprising an aqueous base fluid, a gelling agent, and a multifunctional boronic crosslinker, wherein the multifunctional boronic crosslinker comprises a dendritic polymer comprising a water-soluble monomer and a boronic acid group, wherein the ratio of the water-soluble monomer to the boronic acid group is in the range of from about 1:210 to about 1:800; and introducing the treatment fluid into a subterranean formation.

B. A method comprising: providing a treatment fluid comprising an aqueous base fluid, a gelling agent, and a multifunctional boronic crosslinker, wherein the multifunctional boronic crosslinker comprises a copolymer of a water-soluble monomer and a boronic acid monomer, and wherein the ratio of the water-soluble monomer to the boronic acid monomer is in the range of from about 1:210 to about 1:800; and introducing the treatment fluid into a subterranean formation.

C. A treatment fluid comprising: an aqueous base fluid; a gelling agent; and a multifunctional boronic crosslinking copolymer, wherein the multifunctional boronic crosslinker comprises a dendritic polymer comprising a water-soluble monomer and a boronic acid group and the ratio of the water-soluble monomer to the boronic acid group is in the range of from about 1:210 to about 1:800, or wherein the multifunctional boronic crosslinker comprises a copolymer of a water-soluble monomer and a boronic acid monomer and the ratio of the water-soluble monomer to the boronic acid monomer is in the range of from about 1:210 to about 1:800.

Each of embodiments A, B, and C may have one or more of the following additional elements in any combination:

Element 1: Wherein the water-soluble monomer is selected from the group consisting of an acrylamide; a 2-acrylamido-2-methyl propane sulfonic acid; a N,N-dimethylacrylamide; a vinyl pyrrolidone; a dimethylaminoethyl methacrylate; an acrylic acid; a dimethylaminopropylmethacrylamide; a vinyl amine; a vinyl acetate; a trimethylammoniumethyl methacrylate chloride; a methacrylamide; a hydroxyethyl acrylate; a vinyl sulfonic acid; a vinyl phosphonic acid; a vinylbenzene sulfonic acid; a methacrylic acid; a vinyl caprolactam; a N-vinylformamide; a diallyl amine; a N,N-diallylacetamide; a dimethyldiallyl ammonium halide; an itaconic acid; a styrene sulfonic acid; a methacrylamidoethyltrimethyl ammonium halide; a quaternary salt derivative of an acrylamide; a quaternary salt derivative of an acrylic acid; an alkyl acrylate; an alkyl methacrylate; alkyl acrylamide; alkyl methacrylamide; alkyl dimethylammoniumethyl methacrylate halide; alkyl dimethylammoniumethyl methacrylamide halide; alkyl dimethylammoniumpropyl methacrylamide halide; alkyl dimethylammoniumpropyl methacrylate halide; any derivative thereof, and any combination thereof.

Element 2: Wherein the multifunctional boronic crosslinker comprises between about 2 and about 10 generations.

Element 3: Wherein the multifunctional boronic crosslinker increases the viscosity of the treatment fluid by a factor of at least about 10 compared to the treatment fluid without the multifunctional boronic crosslinker.

Element 4: Wherein the multifunctional boronic crosslinker acts as a friction reducing agent.

Element 5: Wherein the multifunctional boronic crosslinker reduces frictional losses due to friction between the treatment fluid and one or more surfaces contacted by the treatment fluid by an amount in the range of from about 10% to about 70% compared to the treatment fluid without the multifunctional boronic crosslinker.

Element 6: Wherein the treatment fluid is introduced into the subterranean formation at a rate and pressure sufficient to create or enhance at least one fracture therein.

Element 7: Wherein the boronic acid monomer is selected from the group consisting of an allyl boronic acid monomer; an aryl boronic acid monomer; an alkyl boronic acid monomer; an alkenyl boronic acid monomer; an alkynyl boronic acid monomer; a vinyl boronic acid monomer; and any combination thereof.

Element 8: Wherein the treatment fluid further comprises one selected from the group consisting of a solubilizing agent; a crosslinking agent; a breaker; a pH adjusting agent; an electron withdrawing group; a buffer; a particulate; a fluid loss control agent; a surfactant; a dispersing agent; a weighting agent; a scale inhibitor; a clay stabilizer; a silicate-control agent; an antifoaming agent; a foaming agent; a biocide; a biostatic agent; a storage stabilizer; and any combination thereof.

By way of non-limiting example, exemplary combinations applicable to A, B, C include: A with 2, 3, 6, and 8; B with 1, 2, 4, and 7; and C with 5, 6, and 8.

To facilitate a better understanding of the embodiments herein, the following examples of certain aspects of some embodiments are given. In no way should the following examples be read to limit, or define, the scope of the embodiments herein.

EXAMPLES

Figure 1A:
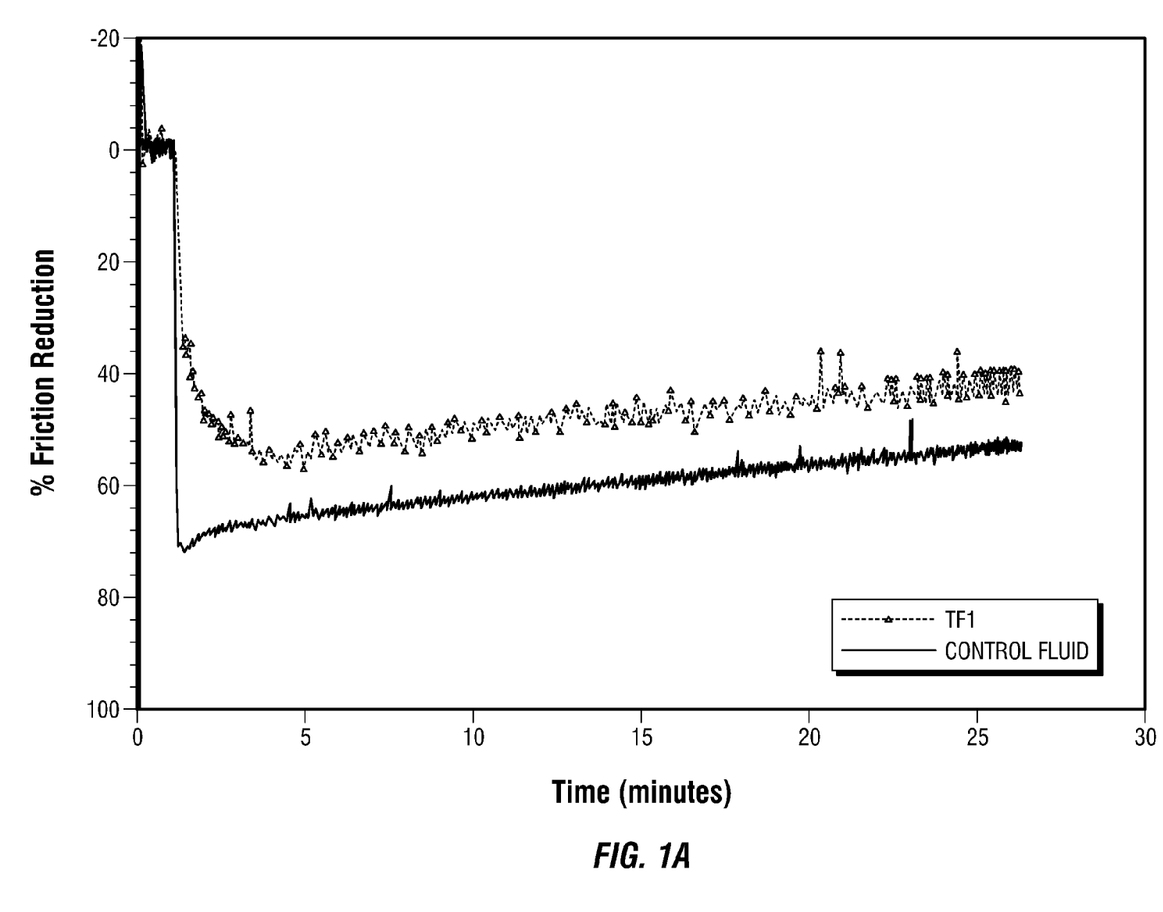
FIG. 1A illustrates the experimental results of a friction reducing analysis of an embodiment of a treatment fluid a comprising multifunctional boronic crosslinker.

In this example, the friction reducing properties of the multifunctional boronic crosslinkers prepared according to an embodiment disclosed herein was evaluated. A copolymer of the multifunctional boronic crosslinkers was prepared using water-soluble monomer acrylamide and boronic acid monomer 3-acrylamido phenylboronic acid in a ratio of boronic acid monomer to water-soluble monomer of 1:266. A treatment fluid (TF1) was prepared comprising 1 gal/1000 gal of the multifunctional boronic crosslinker in fresh water and tested for % Friction Reduction at a flow rate of 28 gal/min. A control treatment fluid (Control Fluid) was prepared comprising 1 gal/1000 gal of polyacrylamide, an industry-wide used friction reducing agent, in fresh water and also tested for % Friction Reduction at a flow rate of 28 gal/min. As shown in FIG. 1, TF1 exhibited far superior % Friction Reduction than the Control Fluid.

Figure 1B:
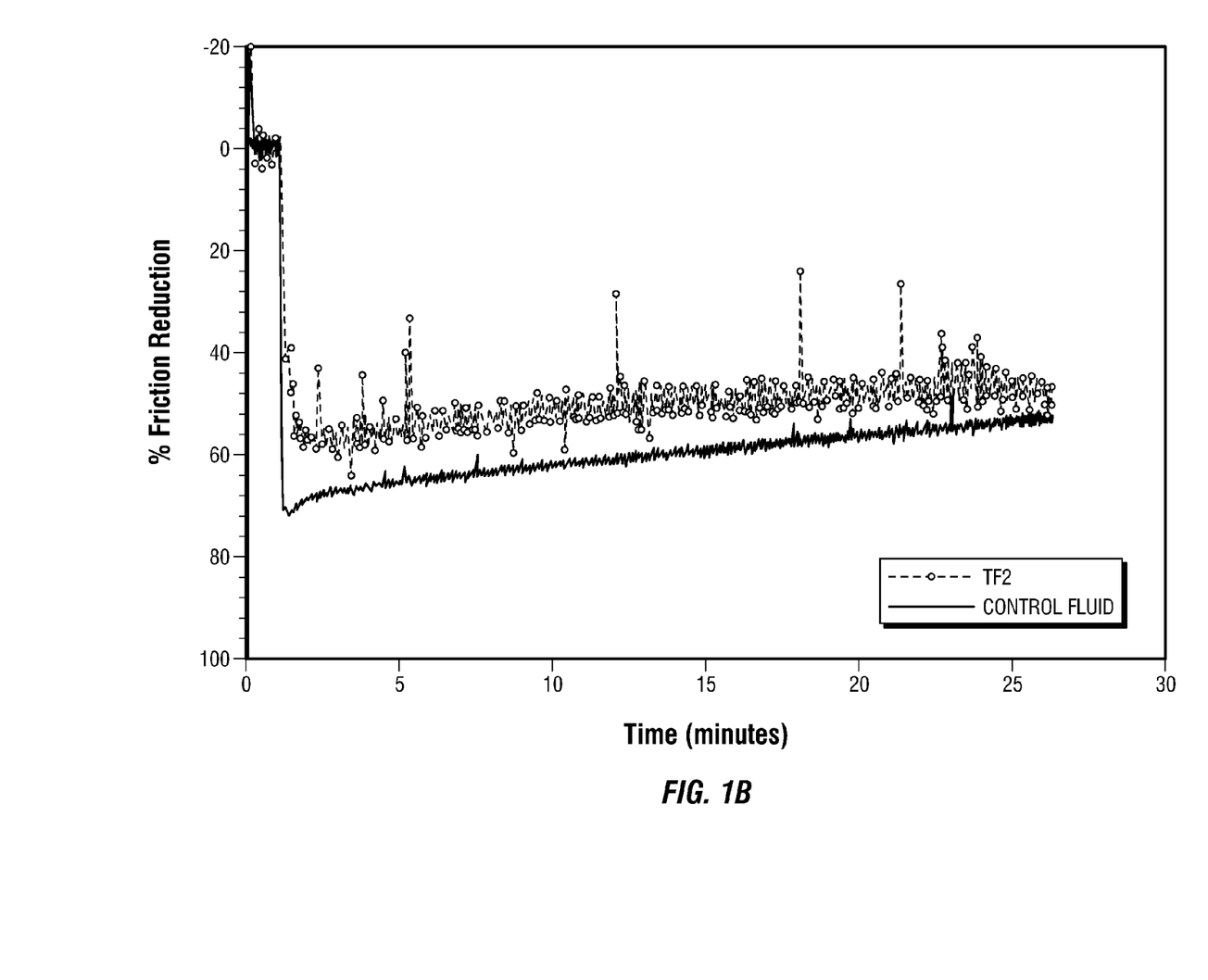
FIG. 1B illustrates the experimental results of a friction reducing analysis of another embodiment of a treatment fluid comprising a multifunctional boronic crosslinker.
Figure 1C:
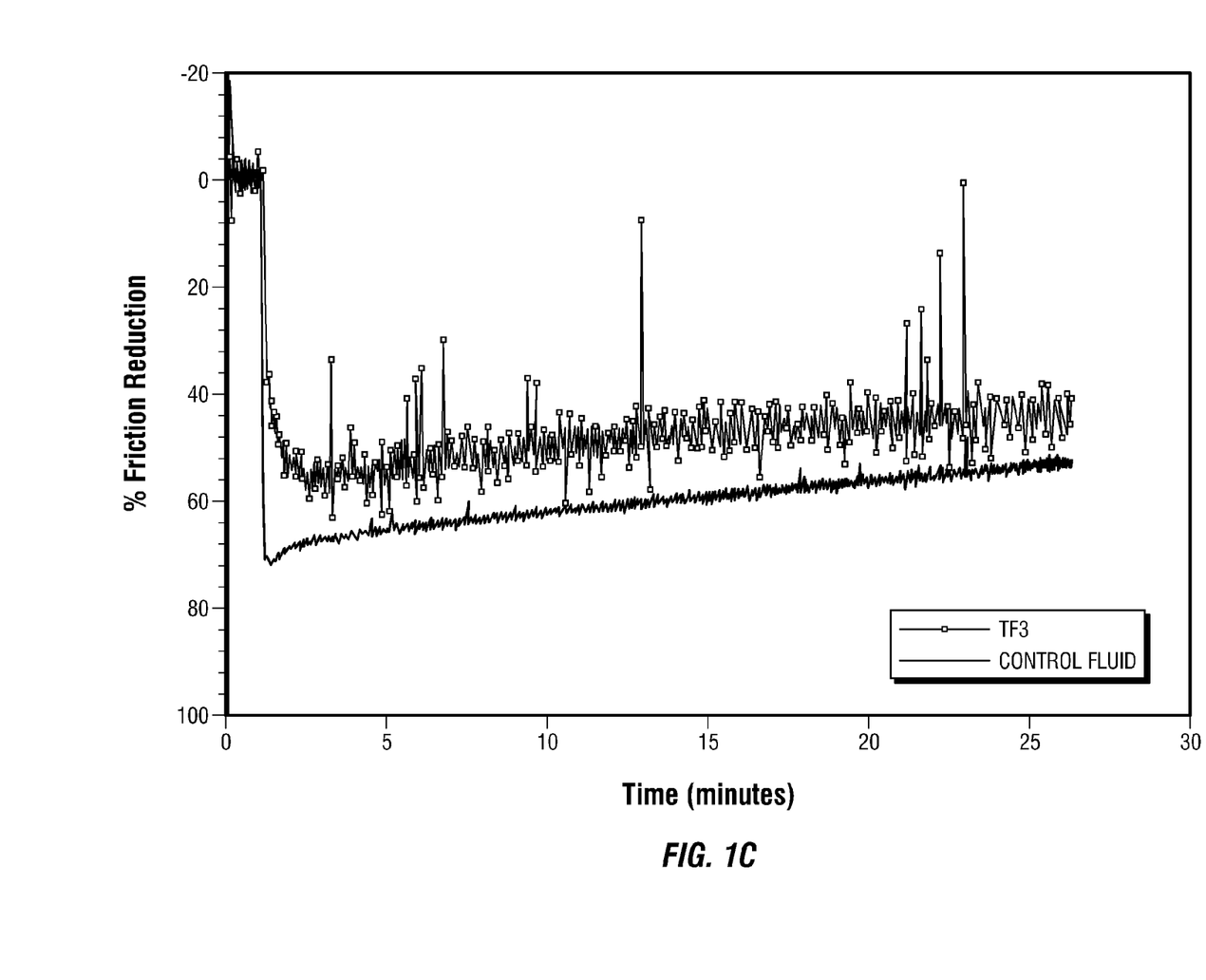
FIG. 1C illustrates the experimental results of a friction reducing analysis of still another embodiment of a treatment fluid comprising a multifunctional boronic crosslinker.

For additional comparison, a second treatment fluid (TF2) was prepared comprising 1 gal/1000 gal of the multifunctional boronic crosslinker in fresh water and tested for % Friction Reduction at a flow rate of 16 gal/min and a third treatment fluid (TF3) was prepared comprising 1 gal/1000 gal of the multifunctional boronic crosslinker in fresh water and tested for % Friction Reduction at a flow rate of 10 gal/min. Both TF2 and TF3 exhibited superior % Friction Reduction compared to the Control Fluid. The results for TF1 are shown in FIG. 1A, the results for TF2 are shown in FIG. 1B, and the results for TF3 are shown in FIG. 1C.

Therefore, the embodiments herein are well adapted to attain the ends and advantages mentioned as well as those that are inherent therein. The particular embodiments disclosed above are illustrative only and may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the embodiments therein. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
providing a treatment fluid comprising an aqueous base fluid, a gelling agent, and a multifunctional boronic crosslinker,
wherein the multifunctional boronic crosslinker comprises a dendritic polymer comprising a water-soluble monomer and a boronic acid group,
wherein the ratio of the boronic acid group to the water-soluble monomer is in the range from about 1:266 to about 1:800; and
introducing the treatment fluid into a subterranean formation.

2. The method of claim 1, wherein the water-soluble monomer is selected from the group consisting of an acrylamide; a 2-acrylamido-2-methyl propane sulfonic acid; a N,N-dimethylacrylamide; a vinyl pyrrolidone; a dimethylaminoethyl methacrylate; an acrylic acid; a dimethylaminopropylmethacrylamide; a vinyl amine; a vinyl acetate; a trimethylammoniumethyl methacrylate chloride; a methacrylamide; a hydroxyethyl acrylate; a vinyl sulfonic acid; a vinyl phosphonic acid; a vinylbenzene sulfonic acid; a methacrylic acid; a vinyl caprolactam; a N-vinylformamide; a diallyl amine; a N,N-diallylacetamide; a dimethyldiallyl ammonium halide; an itaconic acid; a styrene sulfonic acid; a methacrylamidoethyltrimethyl ammonium halide; a quaternary salt derivative of an acrylamide; a quaternary salt derivative of an acrylic acid; an alkyl acrylate; an alkyl methacrylate; alkyl acrylamide; alkyl methacrylamide; alkyl dimethylammoniumethyl methacrylate halide; alkyl dimethylammoniumethyl methacrylamide halide; alkyl dimethylammoniumpropyl methacrylamide halide; alkyl dimethylammoniumpropyl methacrylate halide; any derivative thereof, and any combination thereof.

3. The method of claim 1, wherein the multifunctional boronic crosslinker comprises between about 2 and about 10 generations.

4. The method of claim 1, wherein the multifunctional boronic crosslinker increases the viscosity of the treatment fluid by a factor of at least about 10 compared to the treatment fluid without the multifunctional boronic crosslinker.

5. The method of claim 1, wherein the multifunctional boronic crosslinker acts as a friction reducing agent.

6. The method of claim 5, wherein the multifunctional boronic crosslinker reduces frictional losses due to friction between the treatment fluid and one or more surfaces contacted by the treatment fluid by an amount in the range of from about 10% to about 70% compared to the treatment fluid without the multifunctional boronic crosslinker.

7. The method of claim 1, wherein the treatment fluid is introduced into the subterranean formation at a rate and pressure sufficient to create or enhance at least one fracture therein.

8. A method comprising:
providing a treatment fluid comprising an aqueous base fluid, a gelling agent, and a multifunctional boronic crosslinker,
wherein the multifunctional boronic crosslinker comprises a copolymer of a water-soluble monomer and a boronic acid monomer, and
wherein the ratio of the boronic acid monomer to the water-soluble monomer is in the range from about 1:266 to about 1:800; and
introducing the treatment fluid into a subterranean formation.

9. The method of claim 8, wherein the boronic acid monomer is selected from the group consisting of an allyl boronic acid monomer; an aryl boronic acid monomer; an alkyl boronic acid monomer; an alkenyl boronic acid monomer; an alkynyl boronic acid monomer; a vinyl boronic acid monomer; and any combination thereof.

10. The method of claim 8, wherein the water-soluble monomer is selected from the group consisting of an acrylamide; a 2-acrylamido-2-methyl propane sulfonic acid; a N,N-dimethylacrylamide; a vinyl pyrrolidone; a dimethylaminoethyl methacrylate; an acrylic acid; a dimethylaminopropylmethacrylamide; a vinyl amine; a vinyl acetate; a trimethylammoniumethyl methacrylate chloride; a methacrylamide; a hydroxyethyl acrylate; a vinyl sulfonic acid; a vinyl phosphonic acid; a vinylbenzene sulfonic acid; a methacrylic acid; a vinyl caprolactam; a N-vinylformamide; a diallyl amine; a N,N-diallylacetamide; a dimethyldiallyl ammonium halide; an itaconic acid; a styrene sulfonic acid; a methacrylamidoethyltrimethyl ammonium halide; a quaternary salt derivative of an acrylamide; a quaternary salt derivative of an acrylic acid; an alkyl acrylate; an alkyl methacrylate; alkyl acrylamide; alkyl methacrylamide; alkyl dimethylammoniumethyl methacrylate halide; alkyl dimethylammoniumethyl methacrylamide halide; alkyl dimethylammoniumpropyl methacrylamide halide; alkyl dimethylammoniumpropyl methacrylate halide; any derivative thereof, and any combination thereof.

11. The method of claim 8, wherein the multifunctional boronic crosslinker increases the viscosity of the treatment fluid by a factor of at least about 10 compared to the treatment fluid without the multifunctional boronic crosslinker.

12. The method of claim 8, wherein the multifunctional boronic crosslinker acts as a friction reducing agent.

13. The method of claim 12, wherein the multifunctional boronic crosslinker reduces frictional losses due to friction between the treatment fluid and one or more surfaces contacted by the treatment fluid by an amount in the range of from about 10% to about 70% compared to the treatment fluid without the multifunctional boronic crosslinker.

14. The method of claim 8, wherein the treatment fluid is introduced into the subterranean formation at a rate and pressure sufficient to create or enhance at least one fracture therein.

15. A treatment fluid comprising:
an aqueous base fluid;
a gelling agent; and
a multifunctional boronic crosslinking copolymer,
  wherein the multifunctional boronic crosslinker comprises a dendritic polymer comprising a water-soluble monomer and a boronic acid group and the ratio of the boronic acid group to the water-soluble monomer is in the range from about 1:266 to about 1:800, or
  wherein the multifunctional boronic crosslinker comprises a copolymer of a water-soluble monomer and a boronic acid monomer and the ratio of the boronic acid monomer to the water-soluble monomer is in the range from about 1:266 to about 1:800.

16. The treatment fluid of claim 15, wherein the water-soluble monomer in the dendritic polymer and the water-soluble monomer in the copolymer are selected from the group consisting of an acrylamide; a 2-acrylamido-2-methyl propane sulfonic acid; a N,N-dimethylacrylamide; a vinyl pyrrolidone; a dimethylaminoethyl methacrylate; an acrylic acid; a dimethylaminopropylmethacrylamide; a vinyl amine; a vinyl acetate; a trimethylammoniumethyl methacrylate chloride; a methacrylamide; a hydroxyethyl acrylate; a vinyl sulfonic acid; a vinyl phosphonic acid; a vinylbenzene sulfonic acid; a methacrylic acid; a vinyl caprolactam; a N-vinylformamide; a diallyl amine; a N,N-diallylacetamide; a dimethyldiallyl ammonium halide; an itaconic acid; a styrene sulfonic acid; a methacrylamidoethyltrimethyl ammonium halide; a quaternary salt derivative of an acrylamide; a quaternary salt derivative of an acrylic acid; an alkyl acrylate; an alkyl methacrylate; alkyl acrylamide; alkyl methacrylamide; alkyl dimethylammoniumethyl methacrylate halide; alkyl dimethylammoniumethyl methacrylamide halide; alkyl dimethylammoniumpropyl methacrylamide halide; alkyl dimethylammoniumpropyl methacrylate halide; any derivative thereof, and any combination thereof.

17. The treatment fluid of claim 15, wherein the multifunctional boronic crosslinker increases the viscosity of the treatment fluid by a factor of at least about 10 compared to the treatment fluid without the multifunctional boronic crosslinker.

18. The treatment fluid of claim 15, wherein the multifunctional boronic crosslinker acts as a friction reducing agent.

19. The treatment fluid of claim 18, wherein the multifunctional boronic crosslinker reduces frictional losses due to friction between the treatment fluid and one or more surfaces contacted by the treatment fluid by an amount in the range of from about 10% to about 70% compared to the treatment fluid without the multifunctional boronic crosslinker.

20. The treatment fluid of claim 15, wherein the treatment fluid further comprises one selected from the group consisting of a solubilizing agent; a crosslinking agent; a breaker; a pH adjusting agent; an electron withdrawing group; a buffer; a particulate; a fluid loss control agent; a surfactant; a dispersing agent; a weighting agent; a scale inhibitor; a clay stabilizer; a silicate-control agent; an antifoaming agent; a foaming agent; a biocide; a biostatic agent; a storage stabilizer; and any combination thereof.

* * * * *